United States Patent
Miyake

[11] 3,887,933
[45] June 3, 1975

[54] LENS BARREL FOR AUTOMATICALLY CONTROLLED ELECTRONIC FLASH UNIT

[75] Inventor: Kenichi Miyake, Osaka, Japan

[73] Assignee: Minolta Camera Kabushiki Kaisha, Osaka, Japan

[22] Filed: Jan. 9, 1974

[21] Appl. No.: 432,123

[30] Foreign Application Priority Data
Jan. 23, 1973  Japan................................ 48-11022

[52] U.S. Cl. ............................... 354/195; 354/273
[51] Int. Cl. ............................................. G03b 3/00
[58] Field of Search ........... 354/195, 196, 198, 273, 354/46

[56] References Cited
UNITED STATES PATENTS
| | | | |
|---|---|---|---|
| 3,134,315 | 5/1964 | Kopper | 354/273 |
| 3,344,726 | 10/1967 | Weller | 354/273 |
| 3,499,375 | 3/1970 | Kobayashi et al. | 354/198 |

Primary Examiner—Samuel S. Matthews
Assistant Examiner—E. M. O'Connor
Attorney, Agent, or Firm—Wolder & Gross

[57] ABSTRACT

A lens barrel includes a limiting member supported on a focusing ring and shiftable to a position for ordinary photography and another position for flash photography selectively; a stationary tube having first limiting elements at infinity and the closest subject distance engageable with the limiting member as positioned for ordinary photography to stop the rotation of the focusing ring and second limiting elements engageable with the limiting member as positioned for flash photography at a certain limited subject distance and the closest subject distance to stop the rotation of the focusing ring; and a guide number ring having a third limiting element engageable with the limiting member as positioned for flash photography to limit the rotation of the focusing ring. The guide number ring being rotatably supported by the stationary tube and retainable thereon at a desired set position.

5 Claims, 7 Drawing Figures

LENS BARREL FOR AUTOMATICALLY CONTROLLED ELECTRONIC FLASH UNIT

BACKGROUND OF THE INVENTION

The present invention relates to a lens barrel of camera for use with an automatically light controllable electronic flash unit, more particularly to a lens barrel having means for limiting the automatically light controllable subject distance when taking photographs with such flash unit.

Generally, in taking photographs with an electronic flash unit, the subject distance is determined by the diaphragm aperture value and guide number and, where an automatically controlled electronic flash unit is used, the range of subject distance in which the flashlight is automatically controllable changes with the diaphragm aperture value and guide number selected.

However, in the case of conventional cameras adapted for use with automatically controlled electronic flash units, the subject distance range in which the flash light is automatically controllable is simply ascertained with reference to a numerical table, and the lens barrel is not equipped with means for limiting the automatically light controllable distance range. Thus the conventional cameras are prone to the failure that the subject is photographed at an improper distance beyond the above-mentioned range.

SUMMARY OF THE INVENTION

An object of this invention is to provide a mechanism to be incorporated in a camera for use with an automatically controllable electronic flash unit by which the limit of automatically flashlight controllable subject distance can be detected by the touch during focusing so as to completely eliminate the above-mentioned failure.

Another object of this invention is to provide a mechanism by which the limited range of subject distance wherein the flashlight is automatically controllable can be changed in accordance with the guide number selected.

Still another object of this invention is to provide a mechanism by which the limited range of subject distance wherein the flashlight is automatically controllable can be changed in accordance with the diaphragm aperture value and guide number selected.

According to this invention, a lens barrel for camera includes a focusing ring serving as a member to set the subject distance and rotatable through an angle corresponding to the angle of rotation of a diaphragm ring having an equidistantly calibrated diaphragm scale. The focusing ring supports thereon a limiting member which is rotatable therewith and selectively movable in the axial direction with respect to the ring so as to be shifted to a position for ordinary photography wherein a flash unit is not used or to another position for flash photography.

The focusing ring is rotatably supported on a stationary tube for mounting the lens barrel on the camera main body. The stationary tube is provided with a pair of first limiting elements engageable with the limiting member to prevent the focusing ring from rotation when the focusing ring is rotated with the limiting member set for ordinary photography and is thereby brought to infinity and the closest distance positions. The stationary tube is further provided with a pair of second limiting elements engageable with the limiting member as set for flash photography when the focusing ring is rotated to a certain limited distance position and the closest distance position, the second limiting elements thus acting to prevent the rotation of the focusing ring at these positions. A guide number ring rotatably supported by the stationary tube and retainable thereon at a desired position against rotation is provided with a third limiting element engageable with the limiting member as set for flash photography to prevent the rotation of the focusing ring when the focusing ring is rotated and set for a light controllable maximum subject distance which is determined at least by the maximum amount of light to be emitted from an automatically controlled electronic flash unit and the diaphragm aperture value.

The third limiting element may include another element which is engageable with the limiting member to prevent the rotation of the focusing ring at an automatically light controllable minimum subject distance which is determined by the minimum amount of light to be emitted from the automatically controlled electronic flash unit and the diaphragm aperture value.

The means for retaining the guide number ring at a desired position on the stationary tube comprises click stops interposed between that ring and the stationary tube. Further such means can be provided by supporting the guide number ring rotatably on the diaphragm ring rotatably supported on the stationary tube and retainable at a desired adjusted position by means of click stops and by interposing engaging means between both the rings to effect engagement between the rings at a desired selected position.

In the case where an automatically controlled electronic flash unit is used according to this invention, the limiting member is shifted and set for flash photography. Consequently, if the subject is positioned beyond the range of distance wherein the flashlight is automatically controllable, the focusing ring will be prevented from rotation in the course of focusing movement by the second or third limiting element, which can be detected by the photographer by the touch. Thus a failure under such situation can be prevented completely. Moreover, the present mechanism does not include an additional indicating member which might possibly be overlooked or erroneously recognized in such instance. The limiting member is shiftable to the specified position by easy and simple changeover action and the mechanism involved is greatly simplified.

Even with the use of an automatically controlled electronic flash unit which permits desired selection of diaphragm aperture value, the range of subject distance is properly and automatically changeable in accordance with the variation of aperture value, this making it possible to obtain the information of accurate subject distance all the time.

If a usual electronic flash unit other than automatically controlled electronic flash units and flash bulb are used for taking photographs, the focusing ring is rotated toward long distance position, with the guide number and diaphragm aperture set on the camera. A proper subject distance is then given at the position where the focusing ring stops. Accordingly, troublesome calculation heretofore necessary need not be made. Indeed, the present invention materially simplifies distance and diaphragm setting procedure for flash photography.

Other objects and features of this invention will become more apparent from the following description.

DESCRIPTION OF THE PREFERRED EMBODIMENTS

Figure 1:
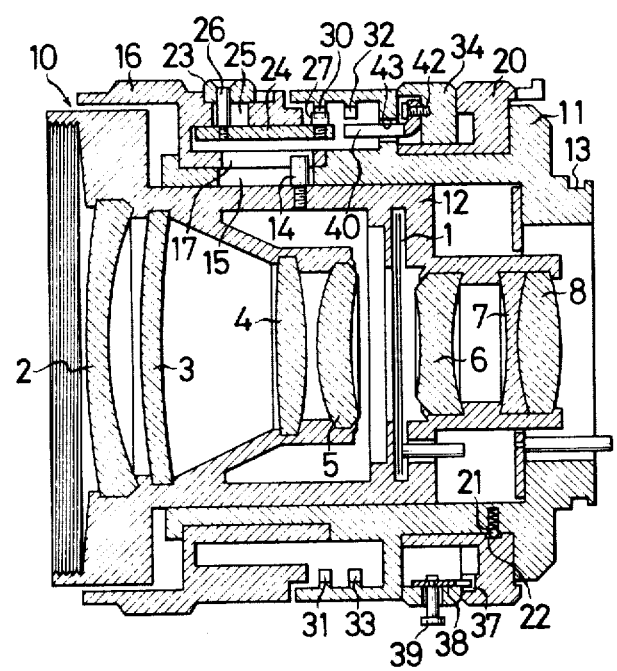
FIG. 1 is a view in vertical section showing an embodiment of this invention.

FIG. 1 shows a lens barrel 10 incorporating unillustrated automatic diaphragm means the mechanism of which is already known and which is coupled a shutter mechanism in the camera body (not shown). The lens barrel 10 includes diaphragm blades 1 and lenses 2 to 8 disposed in front and rear of the diaphragm blades 1 and constituting a photographic optical system along with the diaphragm blades 1. The lenses are held in a frame 12 which is movable in a stationary tube 11 axially thereof. The stationary tube 11 is fixedly mountable on the camera body by a bayonet mount 13, screw mount or some other suitable means to connect the lens barrel 10 to the camera body.

The lens holding frame 12 is provided with a pin 14 which engages in a guide slot 15 formed in the stationary tube 11 in the axial direction and which has a distal end engaged in a cam groove 17 in a focusing ring 16.

The focusing ring 16 is rotatably fitted around and supported by the stationary tube 11, with its cam groove 17 crossing the guide slot 15. Since the pin 14 engages in the crossing, the rotation of the ring 16 moves the pin 14 through the guide slot 15 in the axial direction and thereby moves the lens holding frame 12 forward. The cam groove 17 is inclined with respect to the guide slot 15 such that the displacement of the lens holding frame 12 corresponds to the indication of a distance scale 18 calibrated on the focusing ring 16, the angle of rotation of the focusing ring 16 further corresponding to the angle of rotation of a diaphragm ring 20 having a diaphragm scale 19 calibrated equidistantly in 2 series.

The diaphragm ring 20 is rotatably fitted around the stationary tube 11 and is settable at a desired diaphragm aperture value by means of a click stop 21. The recesses 22 of the click stop 21 of the same number as the aperture settings are arranged in the circumferential direction although unillustrated, and the diaphragm ring 20 is retainable on the stationary tube 11 at a desired aperture setting where the click stop 21 engages.

The focusing ring 16 further carries a knob 23 to effect changeover between ordinary photography and flash photography, the knob being slidable only in the axial direction. The ring 16 also supports on its inner surface a limiting member 24 which is slidable only in the axial direction. The changeover knob 23 and the limiting member 24 are connected together by a pin 26 extending through an axial slot 25 formed in the ring 16. When manipulated, the changeover knob 23 shifts the limiting member 24 to a position for ordinary photography or to a position for flash photography selectively. The limiting member 24 carries at its one end an auxiliary pin 27.

The stationary tube 11 bears an index mark 28 for the distance scale 18 on the focusing ring 16 and another index mark 29 for the diaphragm scale 19 on the diaphragm ring 20 and is formed on its inner surface with a pair of first limiting elements 30 and 31 and a pair of second limiting elements 32 and 33.

The first limiting elements 30 and 31 are disposed in the path of movement of the pin 27 on the limiting member 24 as set for ordinary photography. The pin 27 comes into contact with these elements when the focusing ring 16 is brought to infinity position and the closest distance position as it is rotated therebetween. Thus the two elements serve as stoppers for preventing the rotation of the ring 16. Second limiting elements 32 and 33 are disposed in the path of movement of the pin 27 on the limiting member 24 as set for flash photography. The pin 27 comes into contact with the second limiting elements when the focusing ring 16 is rotated to a certain limited distance position and the closest distance position, the second limiting elements also serving as stoppers for restricting the rotation of the focusing ring 16.

The diaphragm ring 20 further fittingly supports a guide number ring 34 and bears an index mark 36 for a guide number scale 35 calibrated on the guide number ring 34 in the same manner as the diaphragm scale 19. The diaphragm ring 20 is formed in its inner surface with indentations 37 of the same number as the graduations of the guide number scale 35. A plate spring 38 fixed at one end to the inner surface of the guide number ring 34 is engageable in any one of the indentations 37, whereby a desired guide number on the guide number scale 35 can be set to the mark 36. This renders both the rings 20 and 34 rotatable together. A push button 39 on the spring plate 38 has its operating portion projected from the outer surface of the guide number ring 34. When pushed in, the push button 39 disengages the spring plate from the indentation to render the guide number setting adjustable to the guide number peculiar to an automatically controlled electronic flash unit or to the guide number of a usual electronic flash unit or of a flash bulb.

The guide number ring 34 is provided with a pair of third limiting elements 40 and 41 for limiting automatically flashlight controllable distance range which is determined by the guide number and diaphragm aperture value selected. The elements 40 and 41 are secured to the guide number ring 34 by a screw 42 and extend through a circular arc slot 43 formed in the stationary tube 11 so as to be positioned under the inner surface of the tube 11 and in the path of movement of the limiting member 24 as set for flash photography. When the focusing ring 16 is rotated, the third limiting elements 40 and 41 engage the limiting member 24 at a maximum subject distance and minimum subject distance where the flashlight is automatically controllable to restrict the rotation of the focusing ring 16. The limiting positions are shiftable with the guide number ring 34 in accordance with the guide number and diaphragm aperture value selected. When the limiting member 24 is in contact with the element 40 of the pair for limiting the maximum subject distance, there is the relationship of: guide number=diaphragm aperture value × subject distance.

Figure 2:
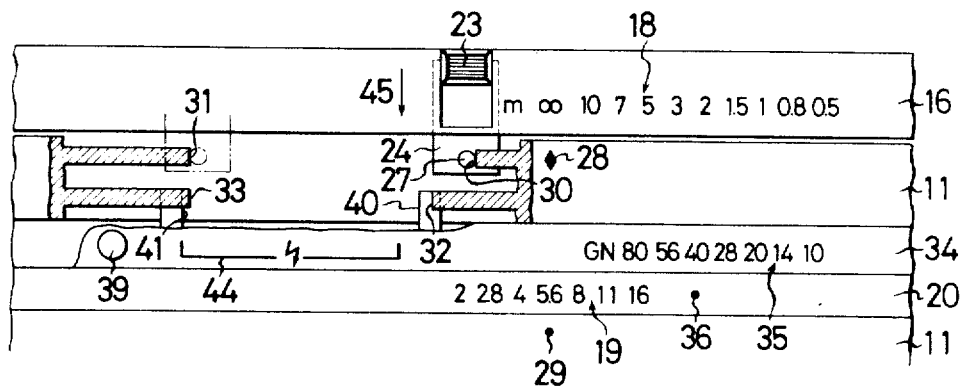
FIG. 2 is a plan view in development partly broken away and schematically showing the principal parts of the embodiment as set for ordinary photography.

FIG. 2 shows the limiting member 24 as set for the ordinary photography, permitting focusing in the subject distance range, for example, of 0.5 m to infinity. More specifically, the rotation of the focusing ring 16 brings the pin 27 on the limiting member 24 into contact with the first limiting element 30 for long distance, with the mark ∞ of the distance scale 18 on the focusing ring 16 opposing the mark 28 on the stationary tube 11, thereby preventing the focusing ring 16 from further rotation in the same direction. Likewise, if the pin 27 comes into contact with the first limiting element 31 for the close distance, preventing the focusing ring 16 from rotating toward a closer distance as indicated in the phantom line in FIG. 2, the mark 28 is adapted to point to 0.5 of the distance scale 18. Thus the focusing ring 16 is permitted to rotate only between infinity and the closest distance.

Figure 3:
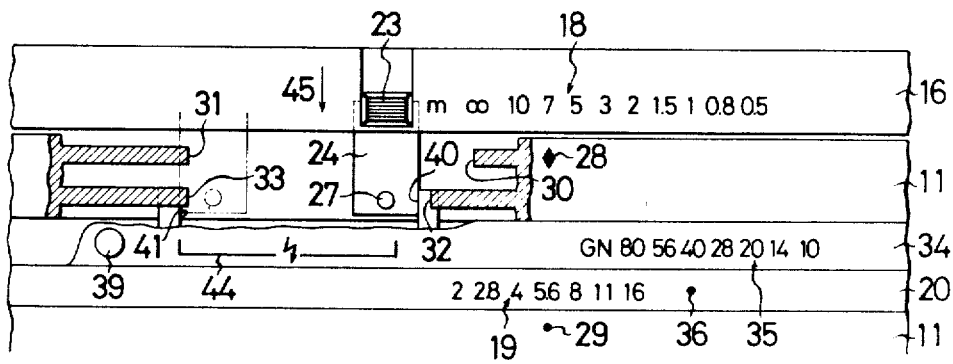
FIGS. 3, 4 and 5 are plan views in development corresponding to FIG. 2 and showing the principal parts of the embodiment as set at various positions to take photographs using an automatically controlled electronic flash unit.

In the case where photograph is taken using an automatically controlled electronic flash unit, the changeover knob 23 on the focusing ring 16 is moved as indicated by an arrow 45 to set the limiting member 24 in the position shown in FIG. 3 et seq. Setting of the member 24 for flash photography changes the path of movement of the member 24 and the pin 27 so that the second and third limiting elements 32, 33, and 40, 41 limit the rotation of the focusing ring 16. Consequently, the maximum range of adjustable subject distance is restricted to the range indicated by a mark 44 showing the range wherein the light is automatically controllable.

Automatically controlled electronic flash units have a photocell for receiving the light reflected from the subject to automatically control the light emitted from the flash unit. Generally they are classified into three groups:

1. Those having a photocell in the taking lens barrel or camera main body for receiving the light impinging on the film surface such that the information obtained is delivered to the circuit of the automatically controlled electronic flash unit.

2. Those having a photocell outside. The sensitivity of the photocell is made variable in operative relation to the diaphragm aperture setting for the taking lens and the speed of film used so that the outside photocell will receive an amount of light which corresponds to that impinging on the film surface.

3. Those having a photocell outside whose sensitivity is invariable in corresponding relation to the diaphragm aperture value. The photographic optical system is therefore set at a constant aperture value.

The constructions 1 and 2 are advantageous in that the diaphragm aperture value for the taking lens is selectable as desired, but the range of subject distance in which the flashlight is automatically controllable varies with the aperture value selected. Accordingly, the range of limitation against improper subject distance must be changed in accordance with the variation.

The illustrated embodiment is adapted for automatically controlled electronic flash units as given under 1 and 2. An automatically controlled electronic flash unit is used which is adapted for light control over a subject distance range including six subject distance settings corresponding to the number of aperture settings, at a film speed of ASA 100 and at a guide number of 40, based on the case wherein the flash light is fully received (see FIG. 6). A series of operations will be described below with reference to FIGS. 3 to 6.

The push button 39 is first depressed to disengage the guide number ring 34 from the diaphragm ring 20. The guide number ring 34 is then rotated to set the guide number scale 35 to the index mark 36 on the diaphragm ring 20 and the push button 39 is thereafter released from the hand, whereupon both the rings 34 and 20 come into engagement with each other to give the desired guide number setting. Subsequently, the diaphragm ring 20 is rotated to set the desired aperture value on the scale 19 to the index mark 29 on the stationary tube 11, whereby the diaphragm ring 20 and the guide number ring 34 will be retained on the stationary tube 11 by means of the click stop 21. Consequently, the third limiting elements 40 and 41 fixed to the guide number ring 34 are shifted to the positions corresponding to the guide number and diaphragm aperture settings. The range of movement of the limiting member 24 thus defined by the third limiting elements 40 and 41 and by the second limiting elements 32 and 33 on the stationary tube 11 is the automatically light controllable subject distance range corresponding to the guide number and aperture settings.

Thus within the range indicated by the subject distance range mark 44 on the guide number ring 34, the changeover knob 23 is movable in the direction of the arrow 45 as already described, whereby the rotation of the focusing ring 16 is limited by the second and third limiting elements 32, 33, 40 and 41 to prevent the focusing ring 16 from rotation beyond the automatically light controllable subject distance range. Thus depending on whether the ring 16 is rotatable or not, it can be reliably ascertained whether the subject is within the automatically light controllable subject distance range.

Figure 6:
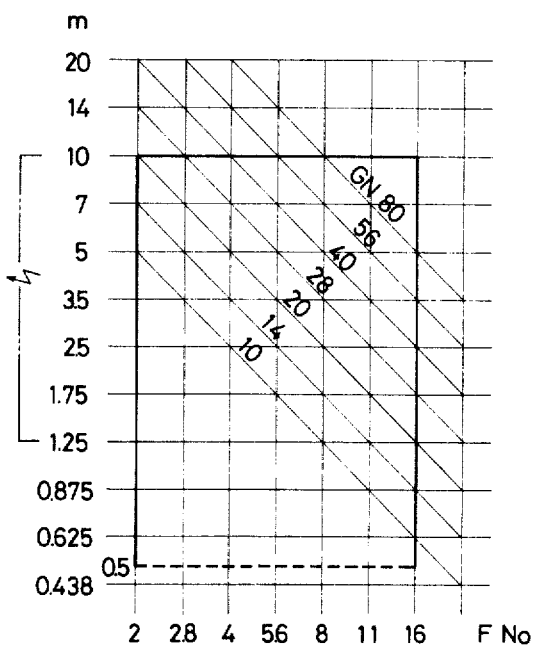
FIG. 6 is a graph showing light controllable subject distance ranges for guide number and diaphragm aperture settings.

FIG. 3 shows a case wherein the guide member is set at 40 and diaphragm aperture value at 5.6. FIG. 6 shows that in this case the automatically light controllable subject distance range is 7 m to 0.875 m. Accordingly, the third limiting elements 40 and 41 limits the range of movement of the limiting member 24, preventing the focusing ring 16 from rotating toward longer and closer distance positions. If the photographer should force the focusing ring 16 to rotate toward a longer or shorter distance position against the limitation by virtue of contact between the limiting member 24 and one of the third limiting elements 40 and 41, the guide number ring 34 and diaphragm ring 20 would be pushed forward, inasmuch as the ring 20 in engagement with the ring 34 is retained on the stationary tube 11 by the click stop, whereby the parts are protected from damage.

Figure 4:
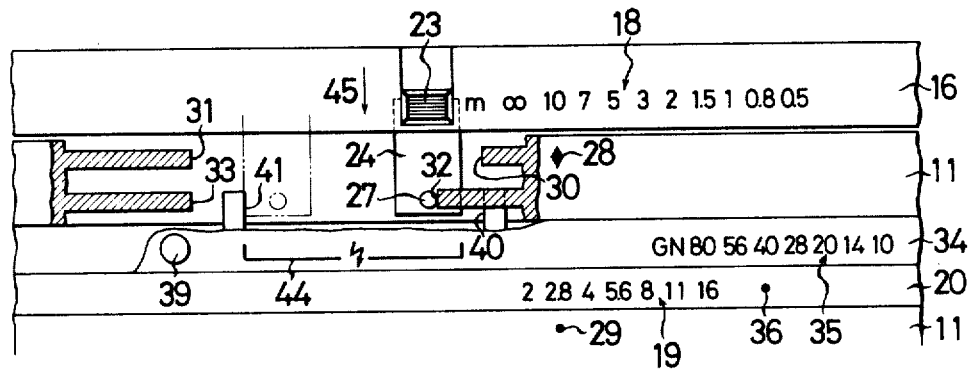

FIG. 4 shows the present embodiment with the guide number setting of 40 and diaphragm aperture setting of 2.8. FIG. 6 indicates that the light controllable subject distance range in this case is 14 m to 1.75 m. However where the automatically controlled electronic flash unit is used, it is practically undesirable to rotate the focusing ring 16 to the position of infinity ∞, so that in the illustrated embodiment, the second limiting element 32 on the long distance side limits the rotation of the focusing ring 16 toward the long distance side up to 10 m. Thus, the third limiting element 40 on the long distance side is positioned to the right of the second limiting element 32 on the long distance side in the drawing, such that when rotated the focusing ring 16 is stopped at the position of 10 m against further rotation toward the long distance side by the contact of the pin 27 on the limiting member 24 with the second limiting element 32.

Figure 5:
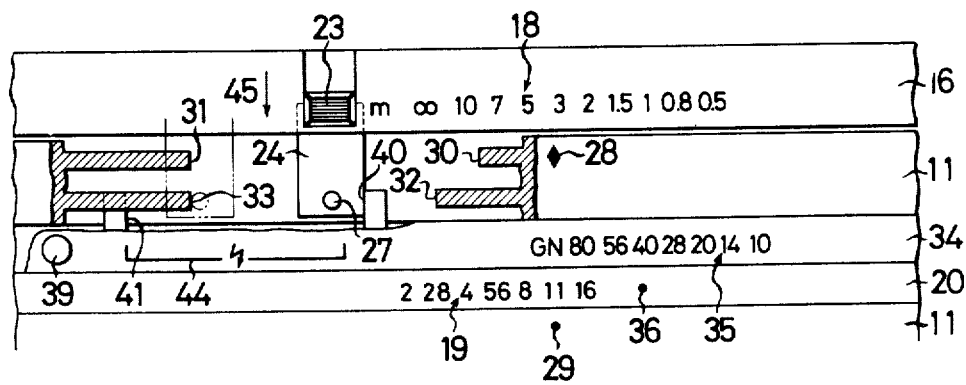

FIG. 5 shows the present embodiment as the guide number is set at 40 and diaphragm aperture value at 11. FIG. 6 indicates that the light controllable subject distance range in this case is 3.5 m to 0.438 m. Inasmuch as the closest focusing distance of the taking lens in the embodiment is 0.5 m, the second limiting element 33 on the close distance side, instead of the third limiting element 41 on the close distance side, is adapted to come into engagement with the pin 27 on the limiting member 24 in the course of rotation of the focusing ring 16 as indicated in the phantom line in FIG. 5 to thereby prevent the focusing ring 16 from moving further toward the close distance side.

Briefly according to the foregoing embodiment, the rotation of the focusing ring 16 for ordinary photography is limited by the first limiting elements 30 and 31 to the focusing range of the taking lens of from infinity to the closest distance, whilst when the automatically controlled electronic flash unit is used, the rotation of the focusing ring 16 is limited by the second limiting elements 32, 33 and the third limiting elements 40, 41 to the subject distance range of a maximum of 10 m to a minimum of 0.5 m wherein the light is automatically controllable.

Figure 7:
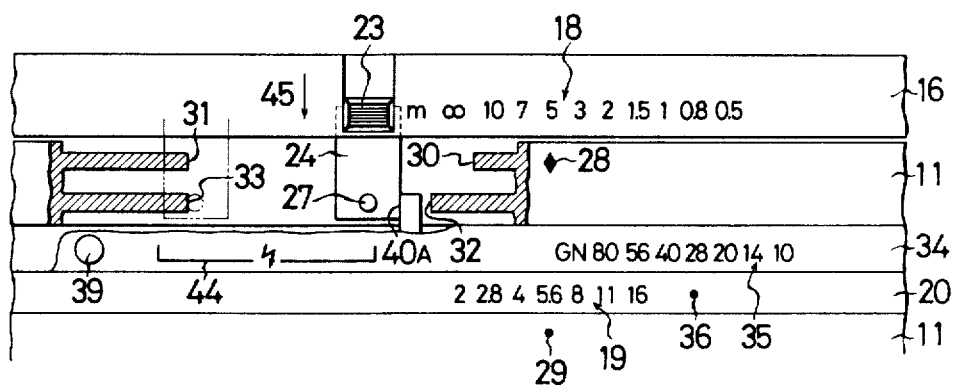
FIG. 7 is a plan view in development showing another embodiment as set for flash photography using an automatically controlled electronic flash unit.

FIG. 7 shows an embodiment of lens barrel which is adapted for a usual automatically controlled electronic flash unit of the diaphragm invariable type such that only when the lens barrel is set to a certain definite diaphragm aperture value, it has a definite range of focusing distance in which the light is automatically adjustable.

Since the closest focusing distance of the lens barrels for ordinary photography is generally 0.5 m for practical reasons, automatically controlled electronic flash units of this type are so constructed that if they have a guide number of up to 28, they permit automatic light control to a close distance limit of 0.5 m in the case where a definite diaphragm value is set on the lens barrel, the long distance limit being determined by the relationship of: subject distance=guide number/diaphragm aperture value.

Accordingly, the third limiting element whose position is determined by the rotation of the guide number ring 34 comprises only an element 40A on the long distance side. The rotation of the focusing ring 16 toward the close distance side is limited by the second limiting element 33 which is positioned on the close distance side.

Accordingly, if the guide number inherent to the automatically controlled electronic flash and the diaphragm aperture value are set, the position of the third limiting element 40A is determined, with the result that the rotation of the focusing ring 16 when taking photographs using the automatically controlled electronic flash unit will be limited by the limiting element 33 and the movable third limiting element 40A, within the range of subject distance determined by the second limiting elements 32 and 33.

It will be readily understood from the foregoing description that in the case where a flash bulb or usual electronic flash unit is used which is not adapted for automatic light control (i.e. which emits a definite amount of light), the guide number inherent to the bulb or unit and the desired diaphragm aperture value are set on the camera, and the focusing ring 16 is then rotated toward the long distance side. A proper subject distance will then by given at the position where the ring is stopped within the subject distance range of up to 10 m. Insofar as the aperture value setting is not such as will cause an over-exposure, the focusing ring 16 will therefore be stopped within the range of up to 10 m, thus eliminating any possibility of taking a photograph at an improper distance.

Although two embodiments are given above, one including a pair of third limiting elements 40 and 41 and the other including only one third limiting element 40A on the long distance side, the third limiting element 41 on the close distance side can be made selectively movable for use with both the electronic flash unit of the automatically controlled type and one which is operable otherwise. The present invention will be embodied into such construction with great ease with reference to the description above.

The cam groove 17 which is employed to render the focusing ring 16 rotatable through an angle corresponding to the angle of rotation of the diaphragm ring 20 can be replaced by some other suitable means to serve the same purpose.

What is claimed is:
1. A lens barrel for use with a camera adapted to be mounted with an automatically light controlled electronic flash unit and further adapted for both ordinary and flash photography, comprising:
   a stationary tube;
   a diaphragm aperture setting ring rotatably provided on said stationary tube and having a calibrated diaphragm scale;
   a lens focussing ring rotatably provided on said stationary tube about an axis and bearing a distance scale thereon and rotatable from an infinity focusing position to a closest focusing position through an angle corresponding to the angle of rotation of said diaphragm aperture setting ring;
   a changing member movable with said focussing ring in the direction of its rotation and movable in the axial direction of said focussing ring from a first position for ordinary photography to a second position for flash photography;
   a pair of first limiting elements on said stationary tube and engageable with said changing member for limiting the range of rotation of said focussing ring between the infinity focusing position and the closest focussing position when said changing member is at said first position;
   a pair of second limiting elements on said stationary tube and engageable with said changing member for limiting the range of rotation of said focussing ring between a maximum focussing position for flash photography and the closest focussing position when said changing member is moved from said first position to said second position;
   a guide number ring having a guide number scale and being rotatably provided on said stationary tube and retainable at desired set positions indicated by the number scale; and
   a third limiting element on said guide number ring and engageable with said changing member for limiting the range of rotation of said focussing ring in one direction to a position determined by the set position of the guide number ring.

2. The lens barrel as set forth in claim 1 wherein the guide number ring is rotatably supported by said diaphragm ring and is provided with means for engaging the guide number ring with the diaphragm ring at a desired set position.

3. The lens barrel as set forth in claim 1, wherein said guide number ring is further provided with another third limiting element engageable with said changing member for limiting the range of rotation of said focussing ring in its other direction to a position determined by the set position of the guide number ring.

4. The lens barrel as set forth in claim 3, wherein said third and another third limiting element form a pair of elements which project in the axial direction of said focussing ring.

5. The lens barrel as set forth in claim 4, wherein said changing member is provided with a pin engageable with said first, second and third limiting elements.

* * * * *